US008165405B2

United States Patent
Lim et al.

(10) Patent No.: US 8,165,405 B2
(45) Date of Patent: Apr. 24, 2012

(54) LEVERAGING TEMPORAL, CONTEXTUAL AND ORDERING CONSTRAINTS FOR RECOGNIZING COMPLEX ACTIVITIES IN VIDEO

(75) Inventors: Jongwoo Lim, Sunnyvale, CA (US); Benjamin Laxton, San Diego, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1219 days.

(21) Appl. No.: 11/876,724

(22) Filed: Oct. 22, 2007

(65) Prior Publication Data
US 2008/0144937 A1    Jun. 19, 2008

Related U.S. Application Data

(60) Provisional application No. 60/870,541, filed on Dec. 18, 2006.

(51) Int. Cl.
*G06K 9/62* (2006.01)
(52) U.S. Cl. ...................................................... 382/224
(58) Field of Classification Search ........................ None
See application file for complete search history.

(56) References Cited

U.S. PATENT DOCUMENTS

| | | | |
|---|---|---|---|
| 6,212,510 B1 | 4/2001 | Brand | |
| 6,226,409 B1 | 5/2001 | Cham et al. | |
| 6,678,413 B1 | 1/2004 | Liang et al. | |
| 6,807,583 B2 | 10/2004 | Hrischuk et al. | |
| 6,944,317 B2 | 9/2005 | Pavlovic et al. | |
| 7,068,842 B2 | 6/2006 | Liang et al. | |
| 2005/0157908 A1* | 7/2005 | Matsugu et al. | 382/107 |
| 2005/0220191 A1* | 10/2005 | Choi et al. | 375/240.16 |
| 2007/0255672 A1* | 11/2007 | Olsson | 706/56 |
| 2007/0297683 A1* | 12/2007 | Luo et al. | 382/224 |
| 2008/0144937 A1* | 6/2008 | Lim et al. | 382/181 |
| 2009/0313294 A1* | 12/2009 | Mei et al. | 707/103 R |

FOREIGN PATENT DOCUMENTS
WO    WO 2005/088505    *  9/2005

OTHER PUBLICATIONS

Rocio Diaz De Leon et al, *A Graphical Model for Human Activity Recognition*, [online], [Retrieved on Mar. 20, 2007, Dated Nov. 18, 2004], Retrieved from the <URL:http://springerlink.com/content/vn0ph9d1umfwq4h>.

(Continued)

*Primary Examiner* — Bhavesh Mehta
*Assistant Examiner* — Tahmina Ansari
(74) *Attorney, Agent, or Firm* — Fenwick & West LLP; Mark E. Duell

(57) ABSTRACT

A system (and a method) are disclosed for recognizing and representing activities in a video sequence. The system includes an activity dynamic Bayesian network (ADBN), an object/action dictionary, an activity inference engine and a state output unit. The activity dynamic Bayesian network encodes the prior information of a selected activity domain. The prior information of the selected activity domain describes the ordering, temporal constraints and contextual cues among the expected actions. The object/action dictionary detects activities in each frame of the input video stream, represents the activities hierarchically, and generates an estimated observation probability for each detected action. The activity inference engine estimates a likely activity state for each frame based on the evidence provided by the object/action dictionary and the ADBN. The state output unit outputs the likely activity state generated by the activity inference engine.

21 Claims, 10 Drawing Sheets

OTHER PUBLICATIONS

Lin Liao et al, *Location-Based Activity Recognition using Relational Markov Networks*, Proceedings of the International Joint Conference on Artificial Intelligence (IJCAI), 2005, pp. 1-6.

David Minnen et al, *Expectation Grammars: Leveraging High-Level Expectations for Activity Recognition*, [online], Retrieved from the <URL:http://citeseer.ist.psu.edu/cache/papers/cs/30054/.

Yifan Shi, *Thesis: Representing and Recognizing Temporal Sequences*, [online], [Retrieved on Feb. 15, 2008, dated Dec. 2006], Retrieved from the <URL:http://etd.gatech.edu/theses/available/etd-08092006-130751/unrestricted/shi_yifan_200612_phd.pdf.

Christopher R. Wren et al, *Toward Scalable Activity Recognition for Sensor Networks*, [online], [Retrieved on Feb. 15, 2008], Retrieved from the <URL:http://web.media.mit.edu/~emunguia/pdf/WrenMunguiaTapia06.pdf.

Vasconcelos, Nuno et al., *Statistical Models of Video Structure for Content Analysis and Characterization*, IEEE Transactions on Image Processing, Jan. 2000, vol. 9, No. 1, p. 3.

PCT International Search Report and Written Opinion, PCT/US07/85273, Jun. 18, 2008, 8 Pages.

\* cited by examiner

LEVERAGING TEMPORAL, CONTEXTUAL AND ORDERING CONSTRAINTS FOR RECOGNIZING COMPLEX ACTIVITIES IN VIDEO

CROSS-REFERENCE TO RELATED APPLICATION

This application claims priority from U.S. Patent Application No. 60/870,541, entitled "Leveraging Temporal, Contextual and Ordering Constraints for Recognizing Complex Activities in Video", filed on Dec. 18, 2006.

FIELD OF THE INVENTION

The present invention relates generally to computer vision methods and systems of pattern recognitions, and in particular to recognizing and representing complex human activities in video sequences.

BACKGROUND OF THE INVENTION

Automatically monitoring and recognizing human activities is a long sought-goal in the computer vision community. Successful implementation of a vision system with the capabilities of automatically recognizing and describing human activities enables new applications such as automatic surveillance monitoring, intelligent transportation systems, manufacture automation, and robotics. Efficiently recognizing and representing complex human activities from a captured video scene are important for such recognition systems.

Human activities in a video sequence are often too complex to be accurately recognized and represented in the real world. For example, a human activity often consists of concurrent and/or partially ordered streams of actions over time. A typical complex activity may last tens of seconds to minutes, may include several sub-activities, and may involve interaction with several objects. Some approaches for detecting short-duration actions in video characterize specific actions using the statistical feature computed over the space-time domain defined by a video segment. A typical short-duration detection method uses a modest number of action classes and an action classifier learned by clustering statistical features computed from training video sequences. The challenges faced by these approaches include a lack of notion of semantic meanings which are used to develop an interpretive context for complex activities recognition.

Motivated by success in natural language processing, methods of using stochastic context free grammars for activity recognition include an interpretive context for more complex activities. A problem with this approach is a lack of a temporal model to efficiently describe a sequence of activities over time. Furthermore, this approach only addresses a single sequence of activities while the activities in the real world often happen in parallel over time.

Other activity recognition methods apply Hidden Markov Models (HMMs) to video streams. For example, multiple HMMs may be used for distinct actions in conjunction with an object detection system to exploit relationships between specific objects and actions. In general, HMM techniques suffer when an activity consists of concurrent or partially ordered streams of actions, which is often the case in real world activities. To handle concurrent and/or partially ordered streams of actions, an HMM must enumerate an exponentially large activity space.

Another class of approaches related to Hidden Markov Models use dynamic Bayesian networks (DBNs) to model activities. DBNs leverages rich event ordering constraints to deal with missing, spurious or fragmented tracks. Some problems with DBNs are the lack of efficient modeling of relationships between partially ordered actions, and lack of scalability to large numbers of activities and lack of appropriate models of action duration.

When describing activities that happen over time, temporal frequency and duration of each activity can be powerful contextual cues. Conventional activity recognition systems like DBNs either ignore temporal modeling or use very simple model such as Gaussians. However, when Gaussian models are used to model temporal constraints for activity recognition, first, Gaussian distributions must either be learned for each action in the model, or generalized for a set of disparate actions. Learning such distributions requires time consuming labeling. Second, Gaussian models still may not provide a meaningful temporal model for actions since the semantic description of an action is often independent of whether the action is performed for a long or short time or interrupted for some indefinite period. Finally, Gaussian models do not incorporate any information about temporal relationships between actions such as occurrence rate and idle time. In general, for many cases a single distribution cannot meaningfully capture the variation in how an action is performed. The action duration can vary greatly depending on the situation and it is unrealistic to expect to have a general duration model for many actions.

SUMMARY OF THE INVENTION

One embodiment of a disclosed system (and method) includes recognizing and representing activities in each frame of an input video stream, and generating an estimation of a likely activity state for each frame. The likely activity state is a current activity and a plurality of activities likely having occurred prior to the current activity. Embodiments of activities recognition include an activity dynamic Bayesian network, an object/action dictionary, an activity inference engine and a state output. The activity dynamic Bayesian network provides the ordering, temporal constraints and contextual cues of a selected activity domain to the activity inference engine. The object/action dictionary detects activities, represents the activities hierarchically, and provides an estimated observation probability for each detected action to the activity inference engine. The activity inference engine estimates a likely activity state for each frame. In one embodiment, the likely activity state is the most likely activity state.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1A:
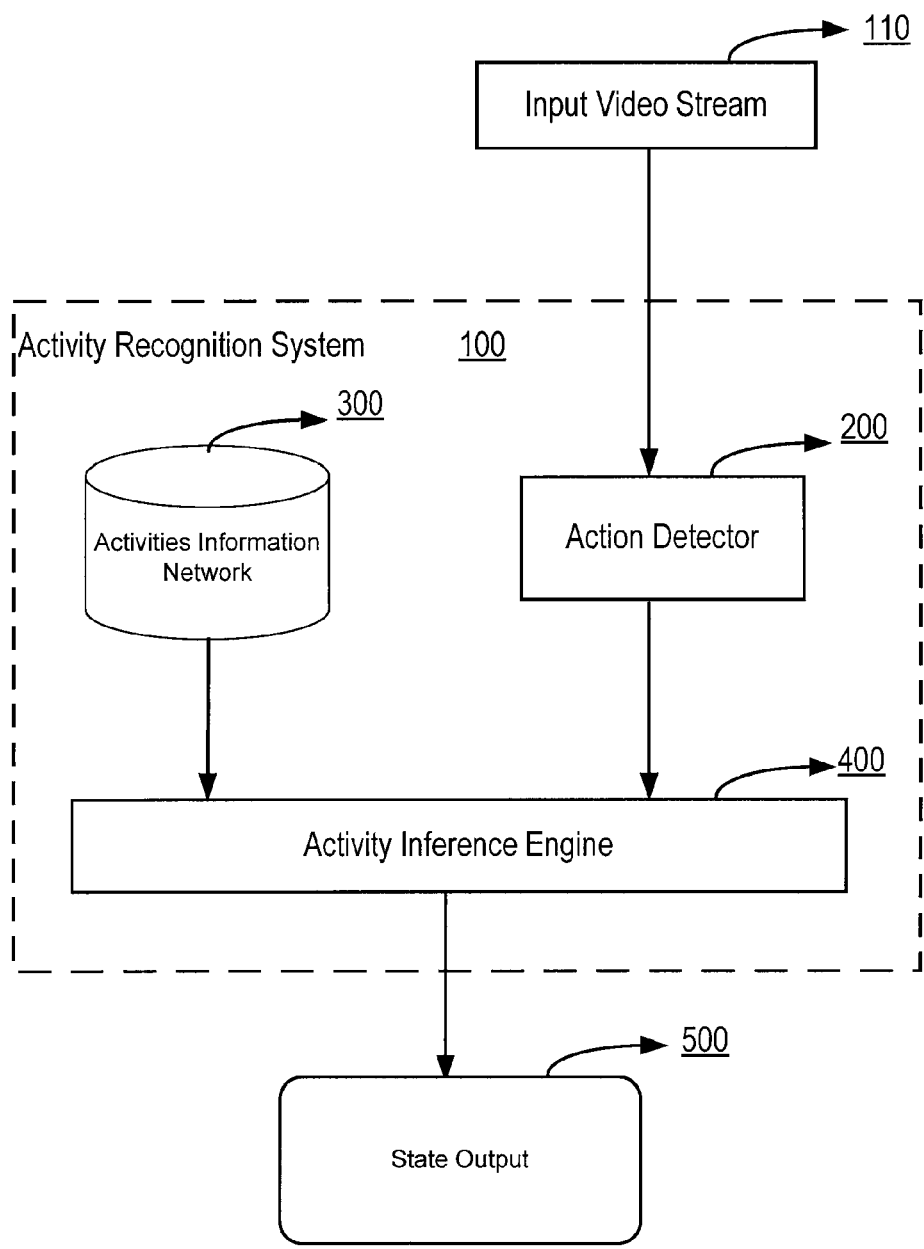
FIG. 1A is a block diagram illustrating an environment having an activity recognition system according to one embodiment.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Architectural Overview

FIG. 1A is a block diagram illustrating an environment having an activity recognition system 100 according to one embodiment. The environment comprises an input video stream 110 and the activity recognition system 100. The activity recognition system 100 comprises an action detector 200, an activities information network 300, an activity inference engine 400 and a state output 500. The action detector 200 processes the input video frames from the input video stream 110 to detect actions in the frames, and generates estimated observation probability associated with each detected action. Based on the actions detected, the activity recognition system 100 selects an activity domain. In one embodiment, the activity inference engine 400 analyzes the detected actions from the action detector 200 with the ordering and temporal constraints of the selected activity domain imposed by the activities information network 300, and generates an estimate of a likely activity state, where the likely activity state is a current activity and the sequence of activities leading up to the current activity or activities. In another embodiment, the action detector 200 may process the input stream with the ordering and temporal constraints of the selected activity domain imposed by the activities information network 300. The state output 500 outputs the likely activity state estimate from the activity inference engine 400.

Figure 7:
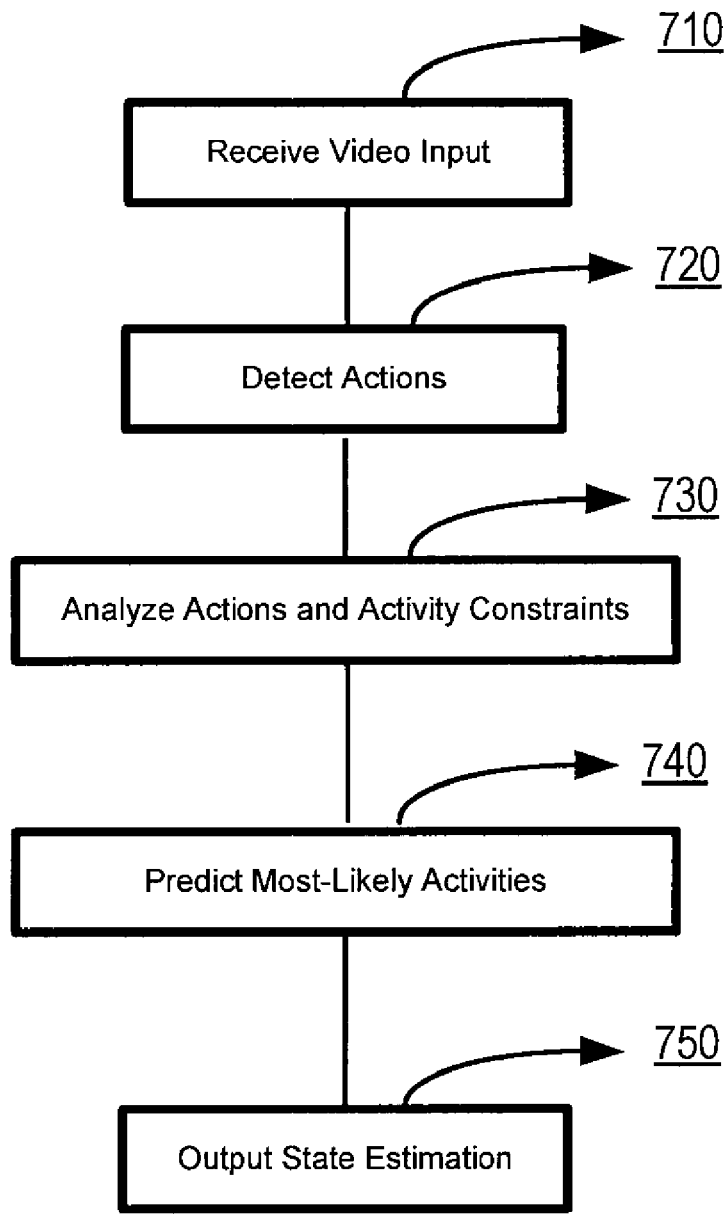
FIG. 7 is a flowchart showing using a method of activity recognition system according to one embodiment.

FIG. 7 is a flowchart showing using a method of activity recognition system 100 according to one embodiment. Other embodiments perform different and/or additional steps than the ones described here. Moreover, other embodiments perform the steps in different orders. A typical embodiment of the activity recognition system 100 process a multiple numbers of input video streams concurrently. Thus, the activity recognition system 100 simultaneously performs multiple instances of the steps described here. For purpose of illustration, the functionalities provided by the action detector 200, the activities information network 300, the activities inference engine 400 and the state output 500 are described below with respect to FIG. 7.

Initially, the action detector 200 receives 710 the video frames from the input video stream 110. For each frame, the action detector 200 detects 720 the actions of the video scene and generates an estimated observation probability for each action detected. The activity inference engine 400 analyzes 730 the actions detected by the action detector 200 and the estimated observation probabilities associated with the each action with the ordering, temporal constraints and contextual cues about the selected activity domain from the activities information network 300. The activity inference engine 400 estimates a likely activity state. In one embodiment, the likely activity state is the most likely activity state. More specifically, the activity inference engine 400 predicts 740 the current activities that are most likely to happen and a sequence of activities leading up to the current activities. The state output 500 outputs 750 the state estimates generated by the activity inference engine 400. The above activity recognition steps are repeated for each video frame of the input video stream 110.

In one embodiment, the input video stream 110 comprises a sequence of video frames. The input video stream 110 may be received from a variety of video sources, such as a television station, a camcorder, a compact disk (CD), a digital versatile disk (DVD), a network, a video database, or a volatile or non-volatile memory for example. The input video stream 110 may also include corresponding audio signals. Further, the input video stream 110 may be received in an analog format and converted to a digital format by an analog-to-digital converter (not shown in FIG. 1A) before being processed by the action detector 300.

The action detector 200 detects actions in each received frame from the input video stream 110, represents activities hierarchically and generates an estimated observation probability for each detected action. Throughout the entire specification in the context of the invention, the term "action" refers to a simple short-term motion with a specific purpose, and term "activity" refers to a sequence of actions required to achieve a meaningful goal. Actions are instantaneous atomic components that cannot be further decomposed to sub-actions, and actions are used to define an activity, which may be composed of several sub-activities, and each sub-activity is defined by the associated atomic actions.

In one embodiment, the action detector 200 is implemented by a hierarchical object/action dictionary. From herein, the reference number "200" is used to represent either "action detector" or "object/action dictionary" throughout the specification. The objects of the object/action dictionary may be concrete objects such as cups, books, computers, people etc. in a scene of a video frame, and the objects may also refer to locations in the scene, such as doorway, hallway, etc. The objects are arranged hierarchically according to "is-a" relationships where more general classes of objects are represented earlier in the hierarchy. Each object may have associated attributes such as a set of possible actions, visual descriptors, location, etc. Objects inherit the attributes defined for their ancestor objects and may add new attributes and additional contextual information to refine the interpretation of the visual descriptors. Consequently, the object/action dictionary 200 exploits the relationships among the objects and the relationship between each object and the set of actions associated with the object, and generates an estimated observation probability for each action given the input video signals.

The activities information network 300 is used to model activities of an activity domain. The activities information network 300 stores prior information about the activity domain, such as the expected actions, and the temporal orderings constraints between the activities, and outputs such prior information about the activity domain to the activities inference engine 400. In one embodiment, the activities information network 300 is defined and represented by an activity dynamic Bayesian network (ADBN). From herein, the terms "activities information network" and "ADBN" are used interchangeably throughout the specification. Each activity is represented by a state node of the ADBN 300. The temporal orderings constraints between the activities are defined by the directed edges between the activities in an ADBN 300. The topology of the activities information network 300 may be specified manually in one embodiment. Alternatively, automatically learning models that encode the structure inherent in activities may be used to model the activities.

The activities inference engine 400 takes two inputs to produce the most likely explanation for the underling evidence represented by the two inputs. The first input to the activities inference engine 400 is the activities and the estimated observation probability associated with each activity detected by the action detector 200 from the input video stream 110. The second input to the activities inference engine 400 is the ordering and temporal constraints enforced by the ADBN 300 for a selected activity domain. In one embodiment, the activity domain is selected from an activity domain database based on the actions detected by the action detector 200 (not shown in the FIG. 1A). The activity inference engine 400 can be implemented by a Viterbi-like inference algorithm. Based on the most likely explanation for the underlying evidence, the activity inference engine 400 maintains what is the most likely explanation of the input video stream by the Viterbi-like inference algorithm. More specifically, for each frame, the inference engine 400 generates a likely activity state, where the likely activity state is a current activity and a plurality of activities likely having occurred prior to the current activity. In one embodiment, the likely activity state is the most likely activity state. The state output 500 outputs the above estimates in a particular format.

Figure 1B:
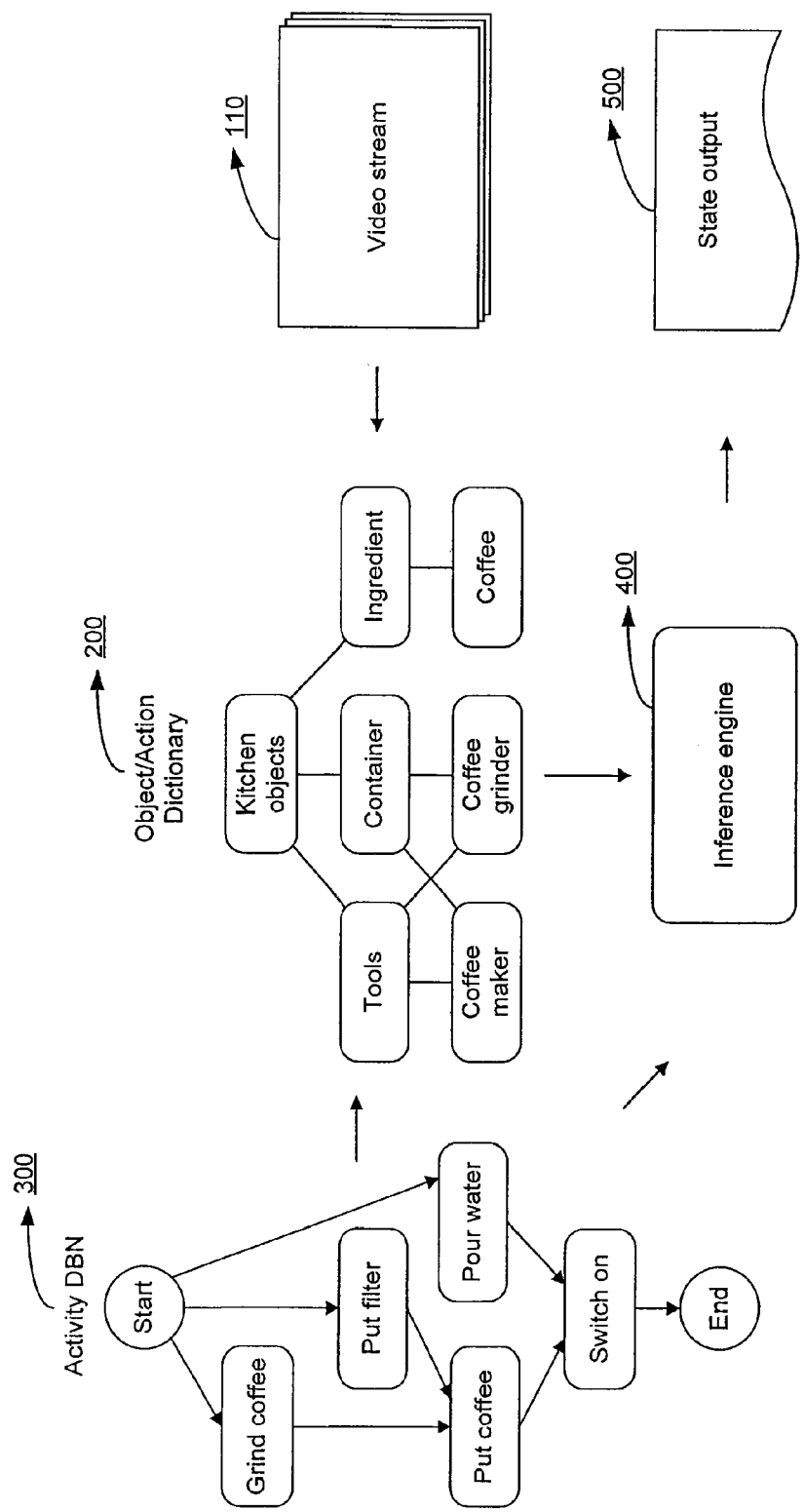
FIG. 1B is an exemplary block diagram illustrating the environment having the activity recognition system with coffee making example according to one embodiment.

FIG. 1B is an exemplary block diagram illustrating the environment having the activity recognition system 100 with a coffee making example according to one embodiment of the present invention. The input video stream 110 comprises a sequence of video frames about coffee making. A coffee brewing activity domain is selected for the coffee making video stream. The activity DBN 300 provides the ordering, temporal constraints and contextual cues about the coffee brewing activity domain to the object/action dictionary 200 and the inference engine 400. The object/action dictionary 200 detects the actions in each frame, represents the detected actions with a hierarchical structure of objects with each object associated with a set of possible actions, and generates an estimated observation probability for each detected action. The activities inference engine 400 receives the objects, the actions associated with each object, and the estimated observation probability associated with each action by the object/action dictionary 200, and the ordering and the temporal constraints of coffee brewing domain from the ADBN 300, and analyze the given inputs and generates the activities which are most likely to happen, i.e. the current states, and the sequences of states leading up to the current states for each frame of the input video stream. The state output 500 receives the estimates from the inference engine 400 and outputs the estimates.

In FIG. 1B, the object/action dictionary 200 receives the frames of the video stream 110 and the ordering, temporal constraints and contextual cues about the coffee brewing activity domain from the ADBN 300. The object/action dictionary 200 detects the activities of the received video input stream 110 and represents the detected activities by a hierarchical tree structure of objects. Each object is associated with a set of possible actions (not shown in the FIG. 1B). Each object is responsible for implementing the action detector 200 that generates an estimated observation probability (not shown in the figure) for a particular action given the input video signals. For example, the top level objects identified by the object/action dictionary 200 are "kitchen objects" that may be "tools", "container" or "ingredient". A "tools" object may be a "coffer maker" or a "coffee grinder". A "container" may also be a "coffee maker", or a "coffee grinder". An "ingredient" object may be "coffee" in this case.

The Activity DBN 300 in FIG. 1B has a default "start" node and a default "end" node at the top and at the bottom of the topology of the network, respectively. The ADBN 300 have five state nodes to represent "grind coffee", "put filter", "pour water", "put coffee" and "switch on" activities. The ordering, temporal constraints and contextual cues about the coffee brewing activity domain are represented by a manually defined topology of the ADBN 300. For example, at the start, one of the three possible actions, "grind coffee", "put filter" or "pour water", may happen. To have "put coffee" happen, activities "grind coffee" and "put filter" must happen before "put coffee". To "switch on" a coffee grinder, activities "put coffee" and "pour water" must happen before "switch on".

To effectively solve the problem of complex human activities recognition in video sequences, in one embodiment, the Viterbi-like inference algorithm is used to implement the inference engine 400. The inference engine 400 receives the estimated observation probability for each action detected by the object/action dictionary 200, and the temporal orderings and contexture cues for the selected activity domain, i.e. coffee brewing, and predicts the most likely to happen activities for each video frame and the sequences of activities leading up to the current activities using the Viterbi-like inference algorithm. The state output 500 outputs the estimates generated by the activity inference engine 400.

Underlying Actions Representations: Object/Action Dictionary

In one embodiment, to provide an estimated observation probability to the activity inference engine 400 for each action detected, the action detector 200 is implemented by an object/action dictionary. The object/action dictionary 200 receives the input video stream 110 and detects actions in each frame. The result from the object/action dictionary 200 is an object-oriented activity knowledge hierarchy. This object-centric view allows composition and inheritance to be used to build arbitrarily complex and descriptive action models of a given input video stream. Objects are arranged hierarchically according to "is-a" relationships where more general classes of objects are presented earlier in the hierarchy. Each object is associated with a set of possible actions. Each object in the hierarchy inherits the properties of its ancestors and adds any new features calculated from the input video stream 110. Consequently, each object with its associated action has an estimated observation probability. Observation probabilities from multiple objects can be combined as a single probability for an input to the ADBN 300 by the activity inference engine 400. New objects and their associated actions can be easily added by inserting an object node into the hierarchy. This does not require modifying existing objects and the associated actions, thus, making the object/action dictionary 200 scalable to multiple complex activities.

In another embodiment, the conventional motion based action detectors are used with the object-oriented activity knowledge hierarchy described by the object/action dictionary 200 to detect and describe the actions in a given input video stream 110. The conventional motion based action detectors are generally concerned with motion signatures of human body and do not consider interactions with objects in a video scene. This type of action detector can be incorporated into the activity knowledge hierarchy by including a "person" object and defining all the motion descriptors as detectors for the possible actions. In this way, the implementation is independent of the specific types of features calculated over the input video stream 110, thus making object-oriented activity knowledge hierarchy flexible and applicable to a wide array of application domains.

Figure 2:
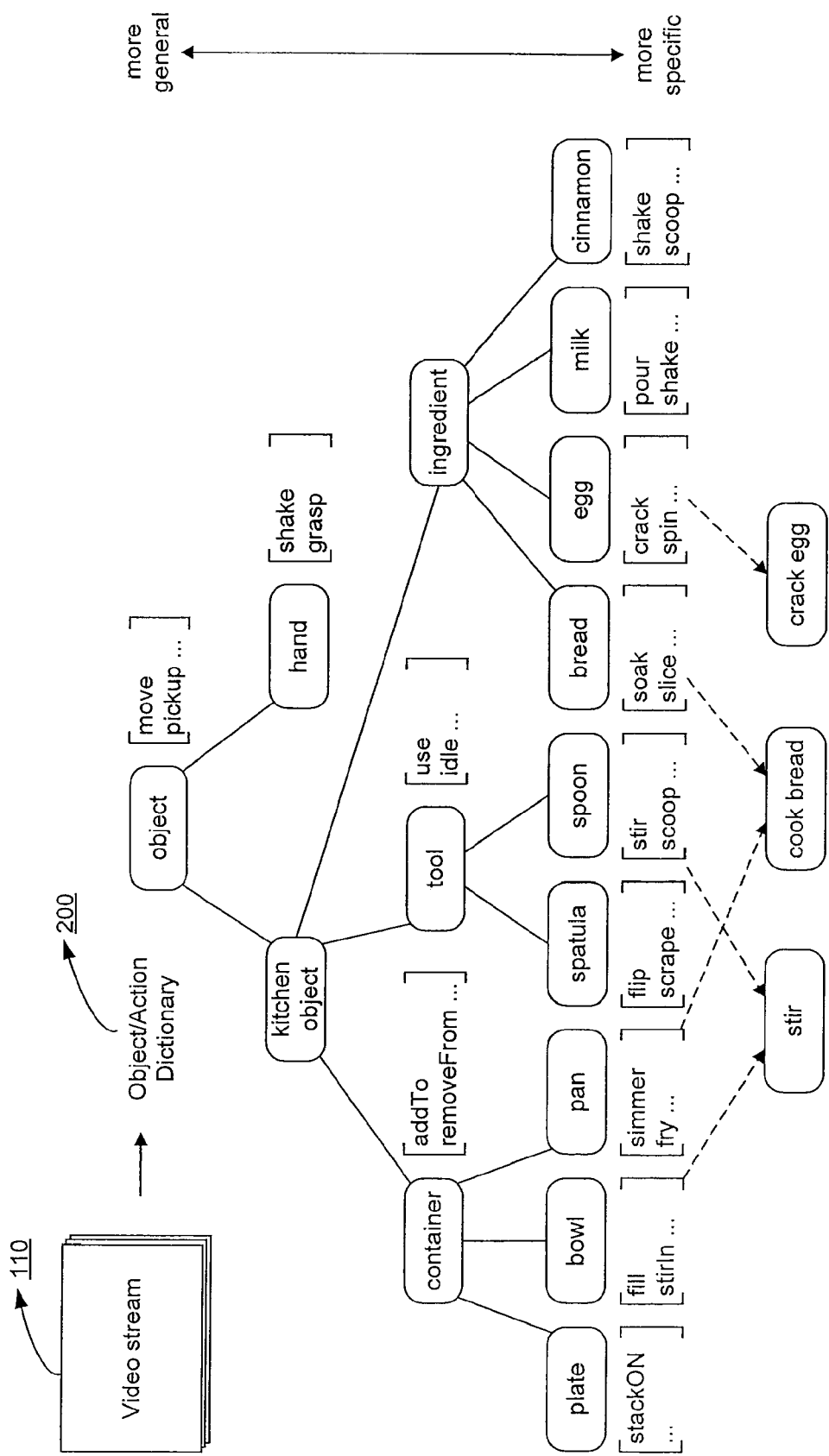
FIG. 2 is a block diagram illustrating an object/action dictionary according to one embodiment.

FIG. 2 is a block diagram illustrating an object/action dictionary 200 according to one embodiment. The input video stream 110 is a cooking sequence involving 30 distinct actions and lasting several minutes. The object/action dictionary receives the cooking video sequence. The result from the object/action dictionary 200 is an object-oriented activity knowledge hierarchy for the cooking sequence. For example, a generic object such as "object" in FIG. 2 is associated with actions such as "move", "pick up" etc. A "hand" may "shake" or "grasp". "Ingredient" may include "bread", "egg", "milk" and "cinnamon" objects as children objects. A "spoon" object can "stir" or "scoop". The estimated observation probability of "cook bread" node is from the combination of the observation probabilities from multiple objects, such "pan" and "bread".

Representing Activities with DBNs: ADBNs

As described above, an activity is a sequence of actions required to achieve a meaningful goal. In one embodiment, an activity dynamic Bayesian network (ADBN) N is used initially to encode the temporal structure and ordering constraints found in a selected activity domain. The activity inference engine 400 applies the ADBN to the activity knowledge hierarchy generated by the action detector 200. Consequently, activities detected are defined hierarchically by ADBN 300 such that each activity is made up of one or more sub-activities and each sub-activity may be further made up of sub-activities or a sequence of instantaneous atomic actions. An ADBN N for a selected activity domain is defined by the equation (1) below, $$N=\{V,E,S\} \quad (1),$$

where V is a set of state nodes to represent a set of atomic actions, $v_i$, that make up an activity, i.e. $v_i \in V$; E represents evidence nodes in the ADBN that incorporate the observation probabilities from the action detector 200 and a temporal model for temporal constraints in one embodiment, $e_i \in E$ for each $v_i \in V$; S represents edges between the state nodes in the ADBN 300 that enforces ordering constraints, i.e. if $s_{ij}=(v_i, v_j)$, $v_i$ must occur before $v_j$, and additionally, there is a single edge between each $v_i$ and its associated $e_i$, i.e. $s_i=(v_i,e_i)$. Each action $v_i$ can be at one of the following states at any time instance $t_i$, i.e. $v_i \in V \rightarrow \langle$"waiting', 'active', 'finished' $\rangle$.. When an action $v_i$ has not yet occurred at time instance $t_i$, it is labeled as "waiting". When the action $v_i$ is currently happening, it is labeled as "active", and after $v_i$ has occurred, it is labeled as "finished".

Figure 3A:
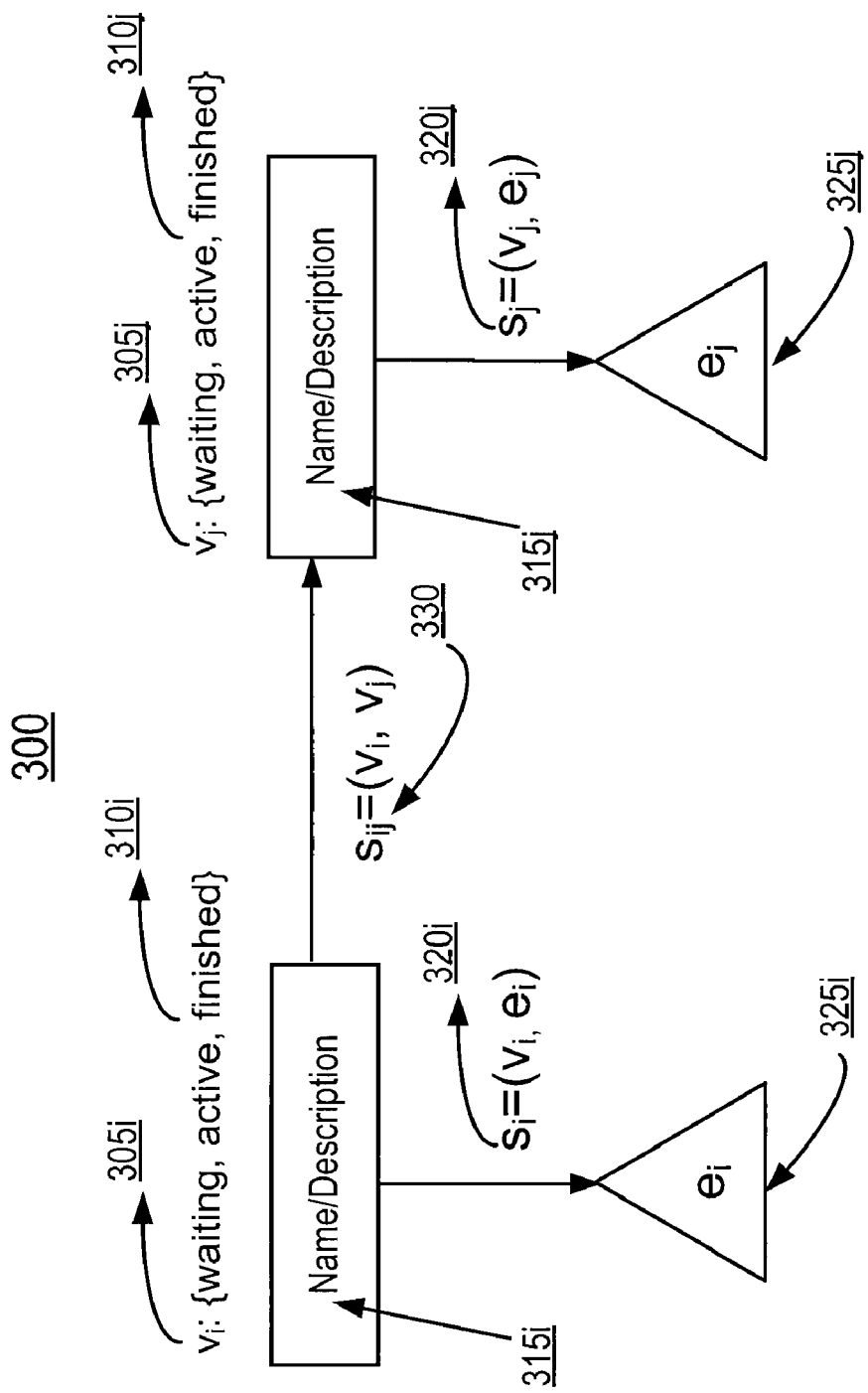
FIG. 3A is a block diagram illustrating an activity dynamic Bayesian network (ADBN) with two state nodes according to one embodiment.

FIG. 3A is high-level block diagram illustrating an activity dynamic Bayesian network 300 with two state nodes $v_i$ and $v_j$ according to one embodiment. Each state node $v_i$ 305 has a name or description 315 to describe the node, and a single evidence node $e_i$ 325 associated with $v_i$ 305. The evidence node $e_i$ 325 incorporates the observation probabilities obtained from the object/action dictionary 200 for a given input video stream 110 and a temporal model. In one embodiment, each state node $v_i$ 305 has two possible edges associated with it, $s_i$ 320 and $s_{ij}$ 330. In another embodiment, each state node $v_i$ 305 has more than two possible edges associated with it depending on the activity topology of the ADBN 300. The edge $s_i=(v_i,e_i)$ 320 between the evidence node $e_i$ 325 and the state node $v_i$ 305 represents the observation probability of the state $v_i$ 305 from the evidence node $e_i$ 325. The directed edge $s_{ij}=(v_i,v_j)$ 330 between any two state nodes $v_i$ and $v_j$ represents the ordering constraints between the two state nodes $v_i$ and $v_j$, i.e. $v_i$ must happen before $v_j$. Each state node $v_i$ 305 has a state 310 from a set of possible states: 'waiting', 'active' or 'finished'. In the context of the invention, for each state node $v_i$ 305, its associated evidence node $e_i$ 325, the edge $s_i=(v_i,e_i)$ 320 between the $v_i$ 305 and $e_i$ 325, and state 310, are omitted to simplify the related figures of ADBN 300 in the specification.

Figure 3B:
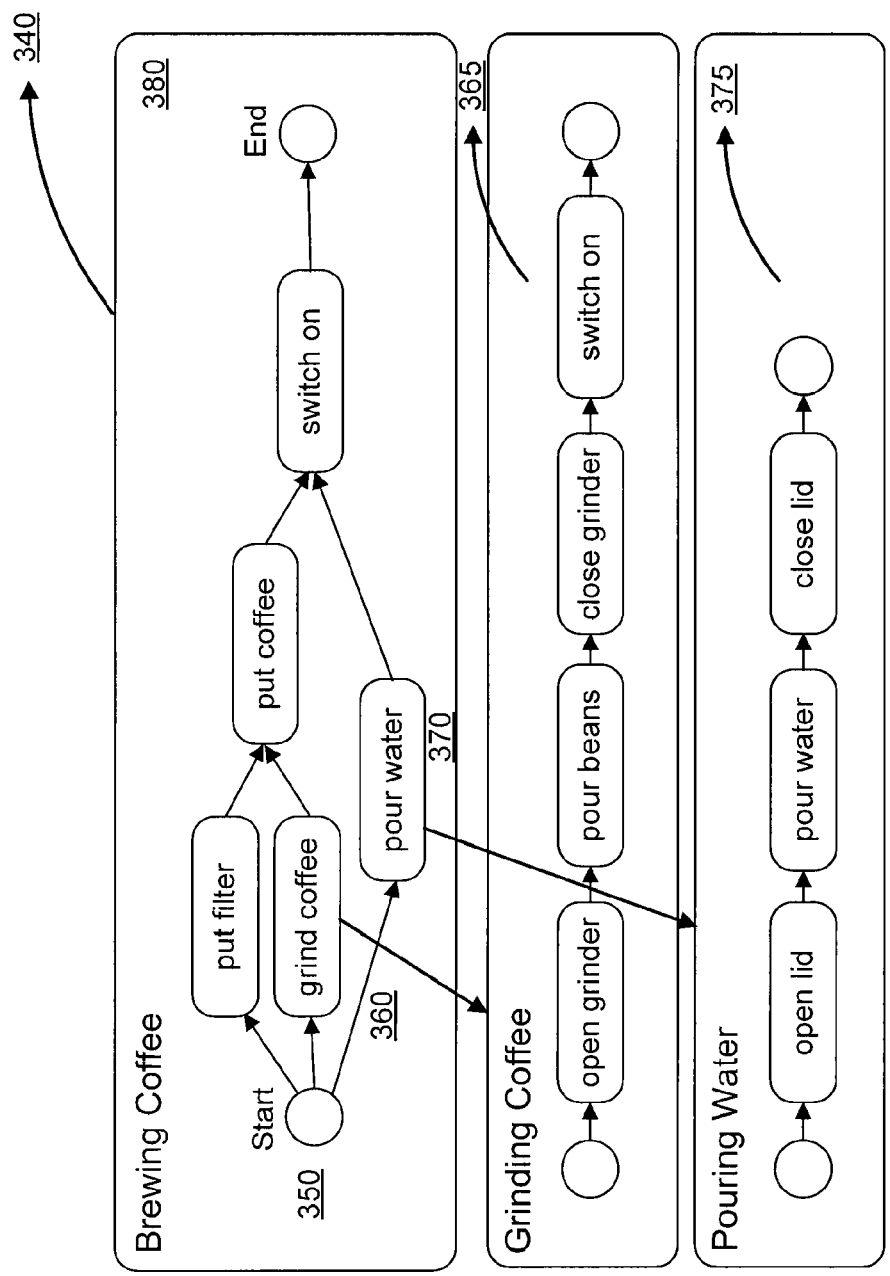
FIG. 3B is an exemplary block diagram illustrating the activity dynamic Bayesian network with coffee brewing example according to one embodiment

FIG. 3B is an exemplary block diagram of ADBN 300 with coffee brewing activity domain 340 at a time instance according to one embodiment. FIG. 3B comprises a primary ADBN 340 describing a top level brewing coffee activities, i.e. states. The primary ADBN 340 includes a default start node 350 and an end node 380. The state nodes of ADBN 340 include "put filter", "grind coffee" 360 and "pour water" 370, "put coffee" and "switch on". The ordering constraints between the activities in the primary ADBN 340 are described by the directed edges between the activities described above. Grinding coffee 360 is again represented by a sub-activity ADBN 365 that comprises a set of actions to further describe grinding coffee 360 activity. The grinding coffee sub-activity ADBN 365 comprises actions such as "open grinder", "pour beans", "close grinder" and "switch on". The ordering constraints between the actions of the ADBN 365 described above are described by the directed edges between the actions. Similarly, pouring water 370 activity is further described by another sub-activity ADBN 375 which includes actions such as "open lid", "pour water" and "close lid".

An input video stream 110 comprises a sequence of video frames to be processed over time. Thus, the actions/activities of each frame varies over time, and the corresponding objection/action dictionary 200 and the inference engine 400 needs to capture such temporal development accordingly. To efficiently represent the ADBN 300 over time, the invention uses partial-ordering and one-time activation constraints. The partial-ordering constraint enforces the rule that a parent state node in the ADBN 300 must not be activated after any child state node has been activated. The one-time activation constraint only allows for a state node to be activated for one time span, although the time span may last over many video frames. These constraints are flexible for modeling many activities, and allow the number of search paths to be significantly pruned by the inference procedure by the inference engine 400.

When describing activities that happen over time, temporal frequency and duration of each activity can be a powerful contexture cue. Conventional activities recognition systems either ignore temporal modeling or use a simple model such as Gaussians. However, for many cases a single distribution cannot meaningfully capture the variation in how an action is performed. The action duration can vary greatly depending on the video content of the input video stream, and it is unrealistic to expect to have a general duration model for many actions. In contrast, the ADBN 300 can incorporate arbitrary probabilistic descriptions of temporal behavior of actions as evidence variables by using an idle time model.

In one embodiment, ADBN 300 uses an Erlang distribution for modeling temporal relationships between actions, which is a continuous probability distribution and is closely related to Poission distribution. The Poission distribution is a probabilistic model for the number of events occurring over some time period whereas the Erlang distribution models the probability of an elapsed time occurring between k independent events. The general form of the probability density function of the Erlang distribution is given in the equation (2) below, $$f(t:k,\lambda) = \frac{\lambda^k t^{k-1} e^{-\lambda t}}{(k-1)!} \text{ for } t > 0, \quad (2)$$

where k corresponds to the number of events being modeled; $\lambda$ represents the expected number of events during a unit time. The function is defined over temporal values t>0.

Furthermore, the ADBN 300 does not explicitly model the duration of each action detected. The ADBN 300 uses an "idle time model". More specifically, the ADBN 300 models the duration of 'no action', that is, the time period between the end of an action and the beginning of the next action. Thus, the ADBN 300 has only one time event to model, i.e. the 'no action' time, for each action detected, and such time events can be assumed independent from each other. Since ADBN 300 only needs to model a single event, i.e. k=1, this special case of Erlang distribution is the exponential distribution given in the equation (3) below, $$f(t;\lambda) = \begin{cases} \lambda e^{-\lambda t} & t > 0 \\ 0 & t < 0. \end{cases} \quad (3)$$

Consequently, the ADBN 300 only needs to specify a single parameter $\lambda$ for the entire ADBN 300 during the activity inference procedure. Alternatively, the ADBN 300 uses an existing action duration model as an augmenting component of an action detector by weighting the observation probability of the action in the activity inference procedure.

Generally, the information contained by the graph N={V, E,S} defines a single slice of time for the ADBN 300 of a selected activity domain and a given input video stream 110. The ADBN 300 over time is a set of ADBNs 300 of the selected activity domain and the given input video stream 110 at a sequence of time instances. At each time instance $t_i$, there is a corresponding ADBN 300 of the selected activity domain for the frame of the input video stream 110 played at $t_i$. Inter-temporal edges are added from each state node $v_i$ at time instance $t_i$, i.e. $v_i(t_i)$ to its corresponding state node $v_i$ at the next time instance $t_j$, i.e. $v_i(t_j)$, in addition to internal edges to all nodes within the ADBN 300 at time instance $t_i$ and $t_j$. Intuitively, a particular action $v_i$ at time $t_i$ may stay the same state or change to a next state at the next time $t_j$, and the next state is defined by the ordering constraints captured by S described above.

Figure 3C:
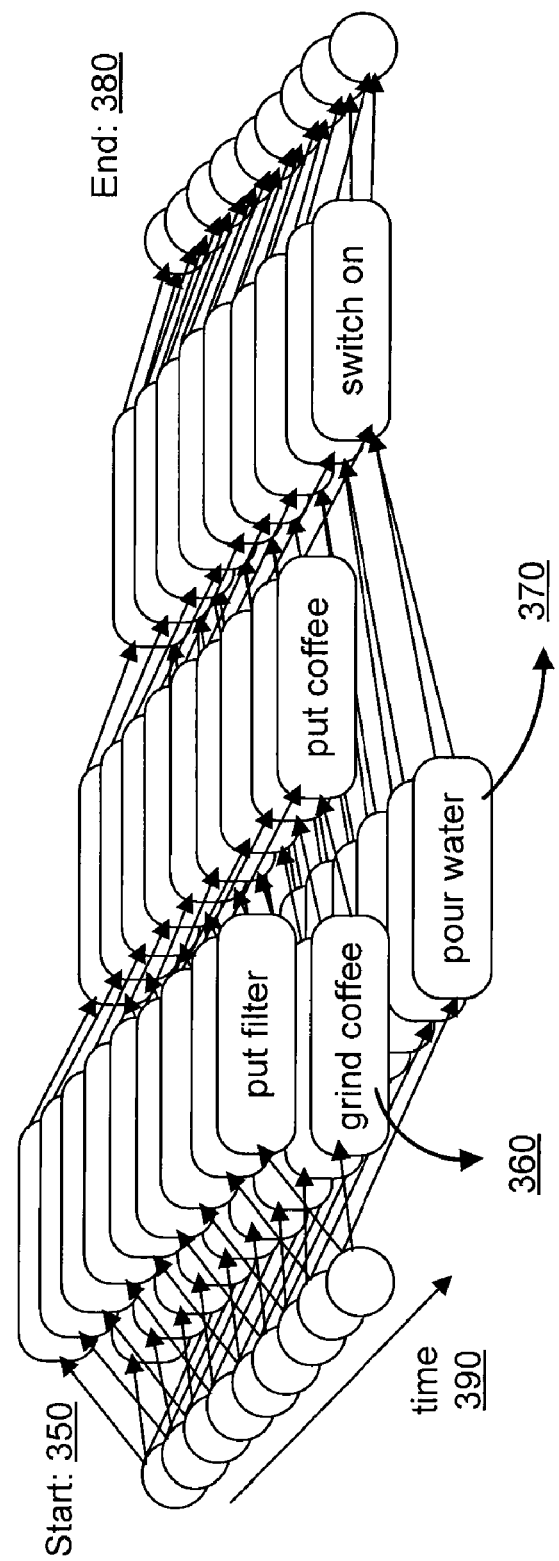
FIG. 3C is an exemplary block diagram illustrating the activity dynamic Bayesian network with coffee brewing example over time according to one embodiment.

To illustrate the ADBN 300 over time described above, FIG. 3C is a partial expansion over time 390 of the ADBN 300 with brewing coffee activity domain 340 described in FIG. 3B according to one embodiment. FIG. 3C comprises a default start node 350, an end node 380, a sequence of time instances $t_i$ 390, and a sequence of brewing coffee ADBNs 340 at each time instance $t_i$ 390.

Activity Inference Procedure: Inference Engine

Given the ADBN 300 of a selected activity domain and the actions detected by the action detector 200 and the estimated observation probability associated with each action as the underlying evidence, the goal of an activity inference engine 400 is to produce the most likely explanation for the underlying evidence. This corresponds to choosing a label from {'waiting','active','finished'} for $v_t \in V$ during each video frame that maximizes the probability given the past states of the ADBN 300, the current probabilistic measures of the actions in the input video sequence captured by the nodes $e_t \in E$, and the constraints defined by the edges $s_t \in S$. The result from the activity inference engine 400 is an updated ADBN 300 that efficiently assigns the most accurate labels to the activities detected by the object/action dictionary 200 for each frame of the given video input stream 110. The problems associated with exact inference in a conventional dynamic Bayesian network, such as posterior distribution estimation, are eliminated since the activity inference engine 400 is only interested in the sequence of state assignments to the updated ADBN 300 that obey the constraints and best explain the underlying evidence.

In one embodiment, the activity inference engine 400 is implemented by a Viterbi-like inference algorithm that uses the following equation (4) to define inference, $$\max_{x_{1:t}} P(x_{1:t}, X_{t+1} \mid o_{1:t+1}) = \qquad (4)$$

$$\alpha P(o_{t+1} \mid X_{t+1}) \times \max_{x_t} \left( P(X_{t+1} \mid x_t) \max_{x_{1:t-1}} P(x_{1:t-1}, x_t \mid o_{1:t}) \right),$$

where $X_t$ is the random variable for a time slice of the ADBN 300 at time t; $X_{1:t}$ is a sequence of state assignments leading up to the current time; $o_t$ is the observation at time t; $o_{1:t}$ is a sequence of observations leading up to the current time. The goal of the Viterbi-like inference algorithm is to find the state assignment $x^*_{1:t}$ with maximal probability given all the evidence. Each sample has a specific state assignment and the associated probability as given in the equation (4). More specifically, a sample represents a state assignment of all the random variables representing time slices of the ADBN 300. For example, the ADBN 300 has 3 random variables and each random variable has 3 possible states. There are 81 possible state assignments, or samples. Some of the 81 possible state assignments are sampled and tested during the inference process. When the observation at time t+1 is available, the Viterbi-like inference algorithm propagates the sample according to a transition model of the ADBN 300 and updates the probability. The transition model represents how likely a transition from one state assignment to another one to happen. To maintain sufficient but not all samples, the Viterbi-like inference algorithm keeps a set of high probability assignments and discards the rest.

For example, in one embodiment, the probability of a sample $P(x_{1:t-1}, x_t \mid o_{1:t})$ is updated as follows, $$P(x_{1:t-1}, x_t \mid o_{1:t}) = P(o^t \mid x_t) P(x_t \mid x_{t-1}) P(x_{1:t-1} \mid o_{1:t-1}) \qquad (5).$$

The first term on the right side of the equation (5), i.e. $P(o_t \mid x_t)$, is the observation probability measured by the action detector 200. The second term on the right side of the equation (5), i.e. $P(x_t \mid x_{t-1})$, is the transition probability specified by the ADBN 300, and the last term on the right side of the equation (5), i.e. $P(x_{1:t-1} \mid o_{1:t-1})$, is the probability of the path through the ADBN 300 leading up to the sample being evaluated, which is the probability of the generating sample. $P(x_t \mid x_{t-1})$ reflects the probability of missed action detections and the connectivity of state nodes in the ADBN 300 by an idle time model in one embodiment, or by the action duration model in another embodiment. Initially, the ADBN 300 is in a default start state described by the equation (6) below, $$P(X_0) = \begin{cases} 1: & x_0 = \langle \text{finished, waiting, } \ldots \text{waiting} \rangle \\ 0: & \text{for all other assignments to } x_0. \end{cases} \qquad (6)$$

Figure 4:
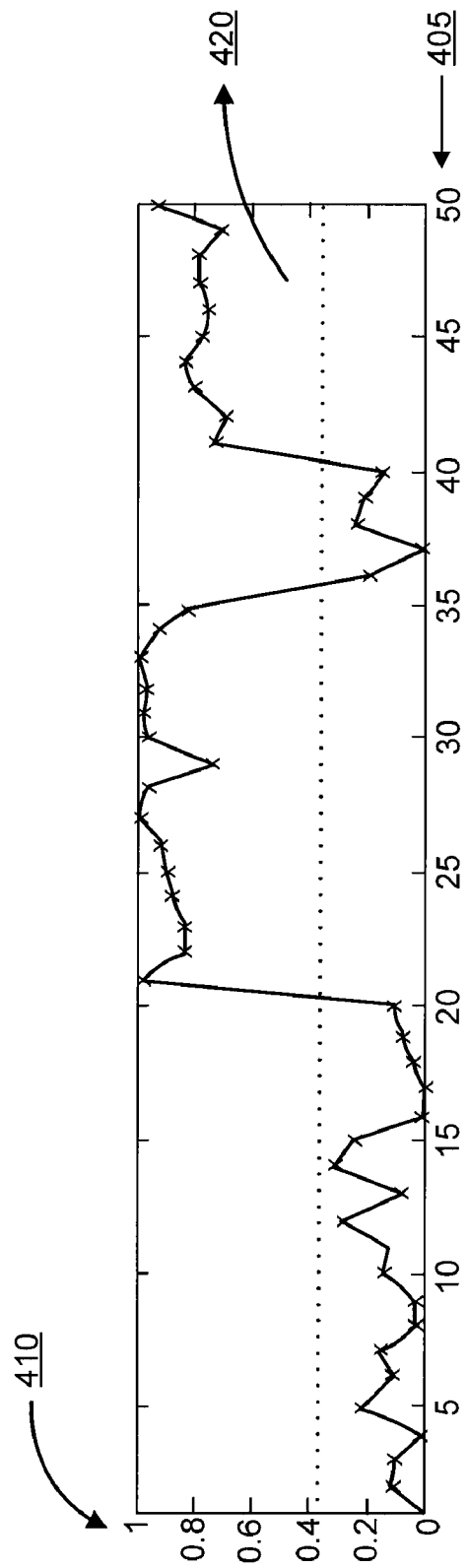
FIG. 4 is an exemplary sequence of observed probabilities for an action A according to one embodiment.

FIG. 4 is an example of a sequence of observation probabilities of an action A using the activity inference engine 400. The x-axis is the time unit in terms of frame numbers 405, and the y-axis is the observation probabilities 410 of the action A. The dotted line 420 represents the unit idle time penalty $e^{-\lambda}$, which serves as an observation probability threshold, and $\lambda=1$ is used in the example. There are four possible cases to be observed for action A:

Case 1: A=waiting and $o_t^A \leq e^{-\lambda}$
Case 2: A=waiting and $o_t^A > e^{-\lambda}$
Case 3: A=Active and $o_t^A \leq e^{-\lambda}$
Case 4: A=Active and $o_t^A > e^{-\lambda}$ Case 1 refers to the observation probabilities below the dotted line and current state is "waiting" in FIG. 4. That is, the observation probability $o_t^A$ is less than or equal to the unit idle time penalty $e^{-\lambda}$. In this case, there is no reason to change action A's status to "active", since the resulting probability of the chance will be always smaller than that of no-change for all possible future state assignments. For example, for frame number 15 in FIG. 4, assuming action A's current state is "waiting", this corresponds to case 1. Its observation probability is below the dotted line. Thus, there is no need to change action A's state. In cases 2 and 3, both choices of assignment change must be explored since, depending on future observations, either choice can have higher probability. In case 2, it has possible higher probability that the state of action A may stay the same as "waiting", or that change from "waiting" to "active" depending on the future observations. Similarly, in case 3, it has possible higher probability that the state of action A may stay the same as "active", or that change from "active" to "waiting" depending on the future observations. In case 4, the observation probabilities of the child nodes of action A are also considered. If all of the child observation probabilities are smaller than the threshold $e^{-\lambda}$, action A will keep the state of "active", since this state gives the maximal probability. Otherwise, all possibilities are investigated in the next time step.

Using the activities inference engine 400 enabled by the invention for activities recognition provides several desirable properties. First, the high level description of an activity given by the ADBN 300 is independent from the underling action detectors 200. The only requirement for the action detectors 200 imposed by such ADBN 300 is that the action detectors 200 can provide some probabilistic estimate of the likelihood of each action occurring. Second, the ADBN 300 enabled by the invention provides a natural way to hierarchically model activities. Furthermore, each ADBN 300 comprises a sequence of atomic actions, however, sub-activities can themselves be represented by sub-activities ADBNs 300 and plugged into a higher level ADBN 300 as prespecified components in one embodiment. Lastly, multiple sub-activities ADBNs 300 can represent multiple parallel streams of actions and can thus efficiently encode all valid partial orderings of parallel actions streams.

Figure 5:
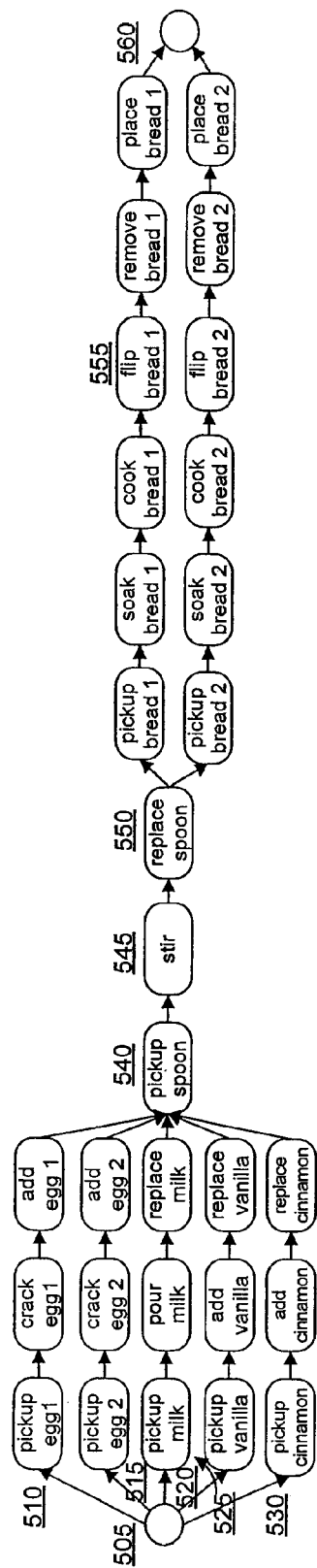
FIG. 5 is an exemplary activity inference engine at work on a French-toast video input according to one embodiment.

FIG. 5 is an exemplary updated ADBN 300 on a French-toast video input generated by the activity inference engine 400 according to one embodiment. The input video stream 110 is a French-toast making sequence involving 30 distinct actions and 10 objects, and lasting several minutes. The selected activity domain is a kitchen. The French-toast making video sequence is fed to the object/action dictionary 200. The objects of interest generated by the object/action dictionary 200 are presented in FIG. 2 described above. The result of the inference procedure by the activity inference engine 400 is the updated ADBN 300 for the French-toast making video sequence. For example, the updated French-toast making ADBN 300 comprises a default start node 505 and an end node 560. The parallel paths such as 505, 515 and 520 in the ADBN 300 encode partial ordering between actions. The path 505 includes "pickup egg1" and "crack egg1" and "add egg1" actions in order. The path 520 includes "pickup milk", "pour milk" and "replace milk" actions in order, etc. At any time instance, any of the listed actions, such as "stir" 545, "flip bread1" 555, may be the current likely state and a sequence of likely states leading to the current state identified by the activity inference engine 400.

Figure 6:
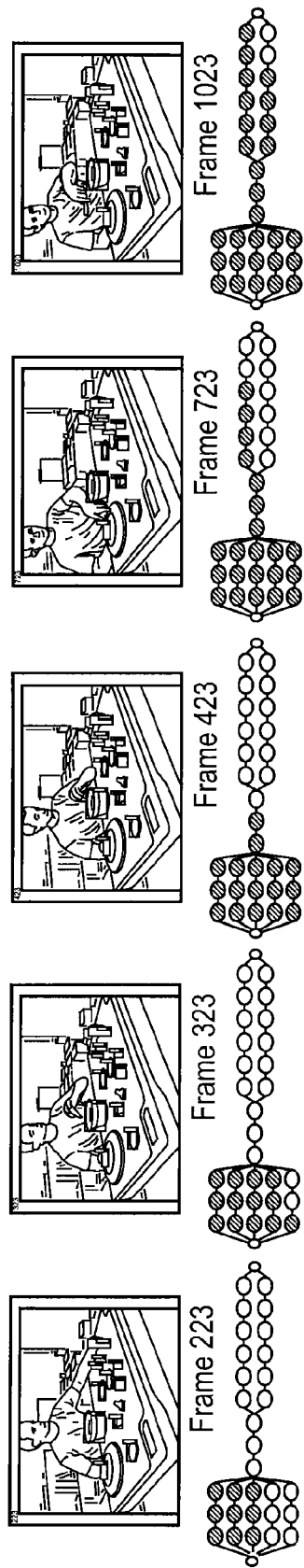
FIG. 6 is an exemplary inference output of French-toast video input by a state output according to one embodiment.

FIG. 6 is an exemplary inference output of French-toast making video input by a state output unit 500 according to one embodiment. FIG. 6 comprises 5 selected frames from the French-toast video sequence. For each frame example in FIG. 6, it has a corresponding ADBN 300 below the frame. Each ADBN 300 is generated by the activity inference engine 400 on the updated French-toast making ADBN 300 described by FIG. 5. Each frame represents a sample processed by the inference engine 400 described above. The darkened nodes in the ADBN 300 represent the current states and a sequence of past states leading up to the current states. The combination of the darkened nodes and bright nodes in the frame is a state assignment, which corresponds to the sample.

During the inference procedure by the activity inference engine 400, each of the state node $v_i \epsilon V$ of the ADBN 300 takes input from the underlying action detector 200 of the associated object in the form of a probabilistic measurement. The temporal model specifies a distribution over the idle times between actions with the Erlang distribution. The Viterbi-like inference algorithm combines the detector and temporal modeling information with knowledge of past states to provide an estimate of the current likely activity state. There are only two parameters that need adjustment during the inference procedure: the number of samples maintained by the inference procedure and $\lambda$ that specifies the rate for the Erlang distribution described above. In one embodiment, the Viterbi-like inference algorithm is written in MatLab and $\lambda \approx 5$ frames/seconds is used to describe the rate for the Erlang distribution.

For example, for frame 423, the current state is "stir" and a sequence of states has happened leading up to "stir", including the 5 parallel paths, i.e. path 510 ("pickup egg1", "crack egg1", "add egg1"), path 515 ("pickup egg2", "crack egg2", "add egg2"), path 520 ("pickup milk" "pour milk", "replace milk"), path 525 ("pickup vanilla", "add vanilla", "replace vanilla") and path 530 ("pickup cinnamon", "add cinnamon", "replace cinnamon"), and an atomic action "pickup spoon". In another embodiment, the inference output unit 500 may output the inference result in text format for each frame of the input video stream 110.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A system for recognizing and representing activities in a video sequence, the system comprising:
   a computer processor adapted to execute computer modules, the computer modules comprising:
       an action detector, adapted to detect activities in frames of the video sequence, and generate an observation probability for each detected action;
       an activity information network, adapted to encode prior information about an activity domain, the activity domain being selected based on the detected actions of the video sequence and the prior information including contextual cues enforcing temporal constraints of each detected action and ordering constraints between the detected actions; and
       an activity inference engine, adapted to estimate, for each frame, based on the detected actions at a time instance in the frame and the prior information of the selected activity domain, a likely activity state, the likely activity state being a current activity and a plurality of activities likely having occurred prior to the current activity.

2. The system of claim 1, wherein each activity comprises one or more atomic actions.

3. The system of claim 1, further comprising an output unit, adapted to output the likely activity state generated by the activity inference engine.

4. The system of claim 1, wherein the activity information network comprises:
   a set of state nodes representing a set of atomic actions;
   a set of evidence nodes incorporating the observation probabilities from the action detector and a temporal model, and each evidence node corresponding to a state node; and
   a set of directed edges between the state nodes enforcing the ordering constraints between actions.

5. The system of claim 4, wherein each action is at least one of the following state at a time instance, waiting, active and finished.

6. The system of claim 4, wherein the temporal model of the activity information network comprises an Erlang distribution to model the temporal relationships between actions.

7. The system of claim 4, wherein the temporal model of the activity information network further comprises an idle time model to model duration of no-action, which is the time period between the end of an action and the beginning of the next action.

8. The system of claim 1, wherein estimating a likely activity state comprises finding a state assignment with maximal probability responsive to all evidence for each state node of the activity information network.

9. The system of claim 8, wherein finding a state assignment with maximal probability comprises calculating a state assignment for each action based on a sequence of prior state assignments and a sequence of observation probabilities leading up to the action being evaluated.

10. The system of claim 8, wherein finding the state assignment with maximal probability further comprises updating the probability of a sample of the activity information network using the observation probability measured by the action detector, the transition probability specified by the activity information network; and the probability of the path through the activity information network leading up to the sample being evaluated.

11. A computer implemented method for recognizing and representing activities in a video sequence, the method comprising:
  detecting activities in frames of the video sequence, and generating an observation probability for each detected action;
  encoding prior information about an activity domain, the activity domain being selected based on the detected actions of the video sequence and the prior information including contextual cues enforcing temporal constraints of each detected action and ordering constraints between the detected actions; and
  estimating, for each frame, based on the detected actions at a time instance in the frame and the prior information of the selected activity domain, a likely activity state, the likely activity state being a current activity and a plurality of activities likely having occurred prior to the current activity.

12. The method of claim 11, wherein each activity comprises one or more atomic actions.

13. The method of claim 11, further comprising outputting the likely activity state.

14. The method of claim 11, wherein encoding the prior information about a selected activity domain comprises defining an activity information network, the activity information network comprising:
  a set of state nodes representing a set of atomic actions;
  a set of evidence nodes incorporating the observation probabilities from an action detector and a temporal model, and each evidence node corresponding to a state node; and
  a set of directed edges between the state nodes enforcing the ordering constraints between actions.

15. The method of claim 14, wherein each action is at least one of the following state at a time instance, waiting, active and finished.

16. The method of claim 14, wherein the temporal model of the activity information network comprises an Erlang distribution to model temporal relationships between actions.

17. The method of claim 14, wherein the temporal model of the activity information model further comprises an idle time model to model duration of no-action, which is the time period between the end of an action and the beginning of the next action.

18. The method of claim 11, wherein estimating a likely activity state comprises finding a state assignment with maximal probability responsive to all evidence for each state node of the activity information network.

19. The method of claim 18, wherein finding a state assignment with maximal probability comprises calculating a state assignment for each action based on a sequence of prior state assignments and a sequence of observation probabilities leading up to the action being evaluated.

20. The method of claim 18, wherein finding the state assignment with maximal probability further comprises updating the probability of a sample of the activity information network using the observation probability measured by the action detector, the transition probability specified by the activity information network; and the probability of the path through the activity information network leading up to the sample being.

21. A non-transitory computer readable storage medium storing executable computer program instructions, the instructions when executed by a processor cause the processor to:
  detect activities in frames of an input video sequence, and generating an observation probability for each detected action, each activity comprising one or more atomic actions;
  encode prior information about an activity domain, the activity domain being selected based on the detected actions of the input video sequence and the prior information including contextual cues enforcing temporal constraints of each detected action and ordering constraints between the detected actions; and
  estimate, for each frame, based on the detected actions at a time instance in the frame and the prior information of the selected activity domain, a likely activity state, the likely activity state being a current activity and a plurality of activities likely having occurred prior to the current activity; and
  output the likely activity state.

* * * * *